(12) United States Patent
Zhao et al.

(10) Patent No.: US 12,487,482 B2
(45) Date of Patent: Dec. 2, 2025

(54) DISPLAY DEVICE

(71) Applicants: Beijing BOE Display Technology Co., Ltd., Beijing (CN); BOE Technology Group Co., Ltd., Beijing (CN)

(72) Inventors: Tanhong Zhao, Beijing (CN); Yangyang Cai, Beijing (CN); Xiaodi Sun, Beijing (CN); Xilei Tian, Beijing (CN); Gang Li, Beijing (CN); Qiaoke Zhou, Beijing (CN); Yawei Chen, Beijing (CN); Guojian Qu, Beijing (CN); Xiang Li, Beijing (CN); Xiaofeng Yin, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/704,035

(22) PCT Filed: Apr. 19, 2023

(86) PCT No.: PCT/CN2023/089139
§ 371 (c)(1),
(2) Date: Apr. 23, 2024

(87) PCT Pub. No.: WO2023/202600
PCT Pub. Date: Oct. 26, 2023

(65) Prior Publication Data
US 2024/0419025 A1    Dec. 19, 2024

(30) Foreign Application Priority Data
Apr. 22, 2022  (CN) .......................... 202220958166.4

(51) Int. Cl.
| | | |
|---|---|---|
| G02F 1/1333 | (2006.01) | |
| G02F 1/1335 | (2006.01) | |
| G02F 1/13357 | (2006.01) | |

(52) U.S. Cl.
CPC .... G02F 1/133331 (2021.01); G02F 1/13338 (2013.01); G02F 1/133512 (2013.01);
(Continued)

(58) Field of Classification Search
CPC ........... G02F 1/133331; G02F 1/13338; G02F 1/133512; G02F 1/133605; G02F 1/133608; G02F 1/133615
See application file for complete search history.

(56) References Cited

U.S. PATENT DOCUMENTS

2011/0051046 A1*  3/2011  Kim ..................... G02B 6/0053
                                                    362/326
2013/0027857 A1*  1/2013  Jeong ................ G02F 1/133512
                                                    361/679.01
(Continued)

FOREIGN PATENT DOCUMENTS

CN        106125397 A    11/2016
CN        107545848 A     1/2018
(Continued)

OTHER PUBLICATIONS

Espacenet English machine translation of CN214752745U (Year: 2021).*

Primary Examiner — Richard H Kim
Assistant Examiner — David Y Chung
(74) Attorney, Agent, or Firm — IPro, PLLC

(57) ABSTRACT

A display device is provided. The display device includes: a first protective cover plate, a second protective cover plate, a first bonding layer, and a display panel; wherein the first bonding layer is disposed between the first protective cover (Continued)

plate and the second protective cover plate and is bonded to the first protective cover plate and the second protective cover plate; and the display panel is disposed on one side of the second protective cover plate distal to the first protective cover plate, and a light-emergent side of the display panel faces the second protective cover plate; wherein a thickness of the first protective cover plate is greater than a thickness of the second protective cover plate.

19 Claims, 5 Drawing Sheets

(52) U.S. Cl.
CPC .. *G02F 1/133605* (2013.01); *G02F 1/133608* (2013.01); *G02F 1/133615* (2013.01)

(56) References Cited

U.S. PATENT DOCUMENTS

| | | | |
|---|---|---|---|
| 2016/0131827 A1* | 5/2016 | Lee | G02B 6/0088 |
| | | | 362/606 |
| 2019/0018276 A1* | 1/2019 | Masamoto | G02B 6/0043 |
| 2021/0407341 A1* | 12/2021 | Shi | H10K 59/8791 |

FOREIGN PATENT DOCUMENTS

| | | | |
|---|---|---|---|
| CN | 211182208 U | | 8/2020 |
| CN | 113050829 A | | 6/2021 |
| CN | 214752745 U | * | 11/2021 |
| CN | 218272983 U | | 1/2023 |
| KR | 20200053820 A | | 5/2020 |

* cited by examiner

DISPLAY DEVICE

CROSS-REFERENCE TO RELATED APPLICATIONS

The present application is a U.S. national phase application based on PCT/CN2023/089139, filed on Apr. 19, 2023, which claims priority to Chinese Patent Application No. 202220958166.4, filed on Apr. 22, 2022 and entitled "DISPLAY DEVICE", the entire content of which is incorporated herein by reference.

TECHNICAL FIELD

The present disclosure relates to the field of display technologies, in particular to a display device.

BACKGROUND

At present, display devices have become indispensable electronic products in people's lives. Various display devices, such as medical display devices, mobile phones, tablet computers, and notebook computers, have greatly increased the convenience of people's lives.

SUMMARY

Embodiments of the present disclosure provide a display device. The technical solutions are as follows:

A display device is provided and includes: a first protective cover plate, a second protective cover plate, a first bonding layer, and a display panel; wherein
- the first bonding layer is disposed between the first protective cover plate and the second protective cover plate and is bonded to the first protective cover plate and the second protective cover plate;
- the display panel is disposed on one side of the second protective cover plate distal to the first protective cover plate, and a light-emergent side of the display panel faces the second protective cover plate;
- wherein a thickness of the first protective cover plate is greater than a thickness of the second protective cover plate.

Optionally, an orthographic projection of the first protective cover plate on a plane where the second protective cover plate is disposed falls within an orthographic projection of the second protective cover plate on the plane where the second protective cover plate is disposed; and the second protective cover plate includes a protruding part, wherein an orthographic projection of the protruding part on the plane where the second protective cover plate is disposed is not covered by the orthographic projection of the first protective cover plate on the plane where the second protective cover plate is disposed.

Optionally, the display panel has a binding region for binding with a driving component, wherein the binding region and the protruding part are disposed on the same side of the display device.

Optionally, the first protective cover plate has a first side surface and three second side surfaces; the second protective cover plate has a third side surface and three fourth side surfaces;
- wherein the first side surface is adjacent to the third side surface and staggered from the third side surface; and the three second side surfaces are in one-to-one correspondence with the three fourth side surfaces, and one second side surface is adjacent to and coplanar with the corresponding fourth side surface;
- wherein part of the second protective cover plate disposed between the third side surface and the first side surface is the protruding part.

Optionally, the first protective cover plate has a central light-transmitting region and an edge light-shielding region disposed at a periphery of the central light-transmitting region, and the display device further includes: a light-absorbing ink layer disposed on one side of the first protective cover plate proximal to the second protective cover plate, wherein the light-absorbing ink layer is disposed in the edge light-shielding region;

or, the second protective cover plate has a central light-transmitting region and an edge light-shielding region disposed at a periphery of the central light-transmitting region, and the display device further includes: a light-absorbing ink layer disposed on one side of the second protective cover plate proximal to the first protective cover plate, wherein the light-absorbing ink layer is disposed in the edge light-shielding region;

or, the second protective cover plate has a central light-transmitting region and an edge light-shielding region disposed at a periphery of the central light-transmitting region, and the display device further includes: a light-absorbing ink layer disposed on one side of the second protective cover plate proximal to the display panel, wherein the light-absorbing ink layer is disposed in the edge light-shielding region.

Optionally, the light-absorbing ink layer is annular, an inner contour line of the light-absorbing ink layer coincides with an outer contour line of the central light-transmitting region, and a width at each position of the light-absorbing ink layer is the same.

Optionally, the thickness of the first protective cover plate ranges from 1.5 mm to 2 mm; the thickness of the second protective cover plate ranges from 0.7 mm to 1.5 mm; and a thickness of the first bonding layer ranges from 0.1 mm to 0.3 mm.

Optionally, the first bonding layer is a planar bonding layer disposed as a whole layer.

Optionally, the display device further includes: a touch panel disposed between the second protective cover plate and the display panel, a second bonding layer disposed between the touch panel and the second protective cover plate, and a third bonding layer disposed between the touch panel and the display panel;
- wherein the second bonding layer is bonded to the touch panel and the second protective cover plate, and the third bonding layer is bonded to the touch panel and the display panel.

Optionally, the second bonding layer and the third bonding layer are both planar bonding layers disposed as whole layers.

Optionally, a thickness of the first bonding layer, a thickness of the second bonding layer, and a thickness of the third bonding layer are equal.

Optionally, the display panel includes: a color film substrate and an array substrate which are disposed oppositely, and a liquid crystal layer disposed between the color film substrate and the array substrate, wherein the color film substrate is closer to the second protective cover plate than the array substrate; and
- the display device further includes: a backlight module disposed on one side of the display panel distal to the second protective cover plate.

Optionally, the backlight module includes: a frame body, an optical diaphragm group, a light guide plate, and a reflective sheet which are disposed in the frame body and are sequentially stacked along a direction distal to the display panel, and a side-lit light source disposed in the frame body and disposed opposite to the light guide plate;

the frame body includes: an iron frame and an adhesive frame connected with the iron frame, wherein the adhesive frame is provided with positioning grooves, and each optical diaphragm in the optical diaphragm group is provided with a positioning protrusion, wherein the positioning protrusion is disposed in the positioning groove, a positioning protrusion in an optical diaphragm in the optical diaphragm group closest to the display panel is provided with a reflective ink layer, the reflective ink layer being disposed on one side of the positioning protrusion distal to the light guide plate;

wherein the reflective ink layer is configured to reflect light, incident to the positioning protrusion, emergent from the light guide plate to the reflective sheet.

Optionally, the iron frame is provided with a back plate, both the reflective sheet and the light guide plate are disposed on the back plate, and the backlight module further includes: a first bonding strip, wherein the first bonding strip is disposed in the frame body and distributed on one side distal to the side-lit light source;

wherein the first bonding strip includes: a strip-shaped first bonding part and a strip-shaped second bonding part, a thickness of the first bonding part is greater than a thickness of the second bonding part, the first bonding part is bonded to edge parts of the back plate and the light guide plate, and the second bonding part is bonded to edge parts of the back plate and the reflective sheet.

Optionally, the backlight module further includes: a reflective strip, wherein the reflective strip is disposed on the frame body and distributed on one side proximal to the side-lit light source, and the reflective strip is disposed on one side of the optical diaphragm group distal to the light guide plate;

wherein an orthogonal projection of the reflective strip on a plane where a light-emergent surface of the display panel is disposed and an orthogonal projection of the side-lit light source on the plane where the light-emergent surface of the display panel is disposed exist an overlapping region; and the orthogonal projection of the reflective strip on the plane where the light-emergent surface of the display panel is disposed is disposed in a non-display region of the display panel.

Optionally, one side of the reflective strip proximal to the optical diaphragm group is bonded to the optical diaphragm in the optical diaphragm group closest to the display panel, and one side of the reflective strip distal to the optical diaphragm group is bonded to the iron frame.

Optionally, the side-lit light source includes: a strip-shaped circuit board and a plurality of light-emitting diode (LED) beads on the circuit board, wherein the circuit board is disposed on one side of the optical diaphragm group, a light-emergent surface of the LED beads faces a side surface of the light guide plate, and the light-emergent surface of the LED beads is in contact with the side surface of the light guide plate; and the backlight module further includes: a second bonding strip, wherein the second bonding strip is bonded to the circuit board and the light guide plate.

Optionally, at least part of the display panel is disposed in the frame body, and the backlight module further includes: an annular adhesive layer disposed between the frame body and the display panel, and the annular adhesive layer is bonded to the frame body and the display panel.

Optionally, the backlight module further includes: an auxiliary adhesive glue layer bonded to an edge part of the display panel and an edge part of the backlight module.

Optionally, the backlight module includes: a frame body, and an optical diaphragm group and a direct-lit light source which are disposed in the frame body and sequentially stacked along the direction distal to the display panel;

the frame body is provided with positioning grooves, and each optical diaphragm in the optical diaphragm group is provided with a positioning protrusion, wherein the positioning protrusion is disposed in the positioning groove, a positioning protrusion in an optical diaphragm in the optical diaphragm group closest to the display panel is provided with a reflective ink layer, and the reflective ink layer is disposed on one side of the positioning protrusion distal to the direct-lit light source;

wherein the reflective ink layer is configured to reflect light, incident to the positioning protrusion, emergent from the direct-lit light source to the direct-lit light source.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

Figure 1:
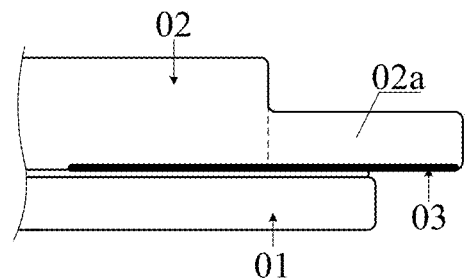
FIG. 1 is a schematic structural diagram of a display device in the related art.

Referring to FIG. 1, which is a structural schematic diagram of a display device in the related art. The display device may include: a display panel 01 and a protective cover plate 02 connected to a display surface of the display panel 01. To provide the protection of the protective cover plate 02 for the display panel 01, it is necessary to increase the thickness of the protective cover plate 02. For example, the thickness of the protective cover plate 02 is 2.9 mm.

The side surface of the protective cover plate 02 proximal to the display panel 01 needs to be provided with a black ink layer 03. The black ink layer 03 is annular and distributed around the protective cover plate 02. By the black ink layer 03, the side surface of the display panel 01 is prevented from light emergence and causing light leakage. The black ink layer 03 needs to cover at least part of a non-display region of the display panel 01. The region in the protective cover plate 02 where the black ink layer 03 is disposed may be called an edge light-shielding region.

In general, the display panel 01 has a binding region for binding with a driving component, and the light-shielding binding region is usually distributed on one side in the non-display region of the display panel 01, while the other three sides of the non-display region of the display panel 01 are not provided with the binding regions. Therefore, in the non-display region of the display panel 01, the width of one side where the binding region is set is greater than the widths of the other three sides.

To improve aesthetics of the front surface of the display device, it is necessary to ensure that the width at each position of the annular black ink layer 03 is equal. Therefore, it is usually necessary to cut one side in the protective cover plate 02 proximal to the binding region of the display panel 01 to form a step structure 02a. Generally, the stepped structure 02a needs to be provided with a structure (for example, a shell or silica gel, etc.) which is different from the material of the protective cover plate 02 thereon. In this way, the width at each position of the edge light-shielding region of the protective cover plate 02 is equal when viewed from the front surface of the display device, thereby improving the aesthetics of the front surface of the display device.

However, the process of cutting the side surface of the protective cover plate 02 to form the step structure 02a is complicated, leading to lower preparation efficiency and higher manufacturing cost of the display device.

Figure 2:
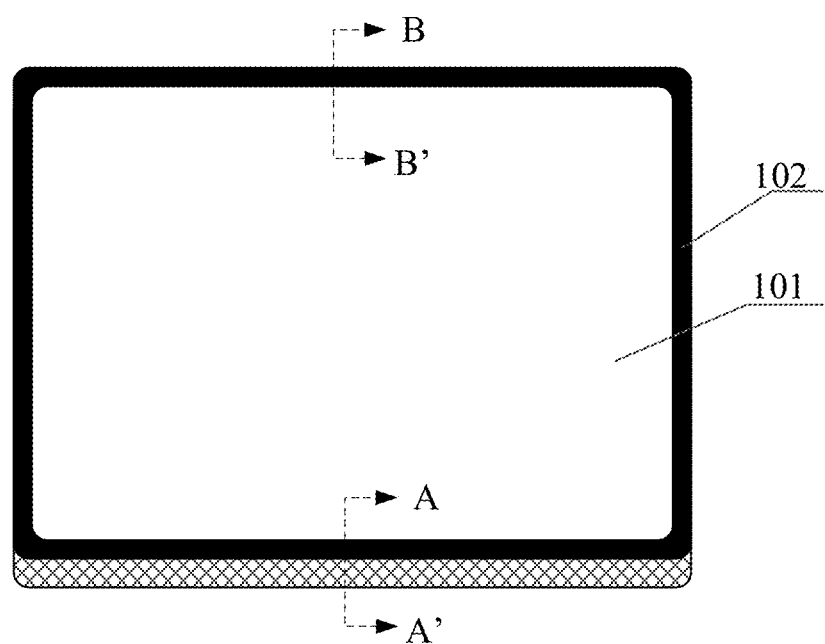
FIG. 2 is a top view of a display device according to some embodiments of the present disclosure.
Figure 3:
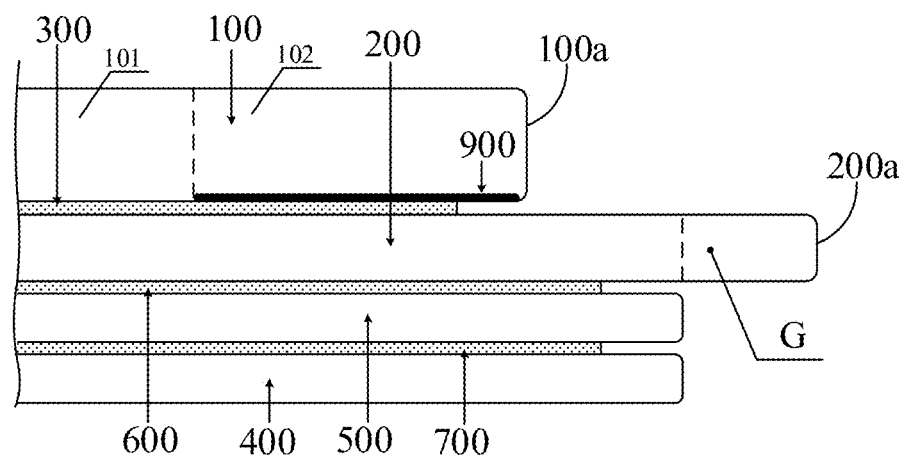
FIG. 3 is a cross-sectional view of the display device shown in FIG. 2 at A-A'.

Referring to FIG. 2 and FIG. 3. FIG. 2 is a top view of a display device according to some embodiments of the present disclosure, and FIG. 3 is a cross-sectional view of the display device shown in FIG. 2 at A-A'. The display device 000 may include: a first protective cover plate 100, a second protective cover plate 200, a first bonding layer 300, and a display panel 400.

The first bonding layer 300 in the display device 000 may be disposed between the first protective cover plate 100 and the second protective cover plate 200, and bonded to the first protective cover plate 100 and the second protective cover plate 200 respectively.

The display panel 400 in the display device 000 is disposed on one side of the second protective cover plate 200 distal to the first protective cover plate 100, and a light-emergent side of the display panel 400 faces the second protective cover plate 200. Exemplarily, a display surface of the display panel 400 is connected with one side of the second protective cover plate 200 distal to the first protective cover plate 100.

The thickness of the first protective cover plate 100 is greater than the thickness of the second protective cover plate 200.

In the embodiments of the present disclosure, after the front surface of the display device 000 is subjected to an impact force, both the first protective cover plate 100 and the second protective cover plate 200 can withstand the impact force, and the first bonding layer 300 disposed between the first protective cover plate 100 and the second protective cover plate 200 can buffer the impact force. In this way, by the first protective cover plate 100 and the second protective cover plate 200 which are stacked and the first bonding layer 300 disposed therebetween, the display panel 400 can be effectively protected, and the probability of breakage of the display device 000 during use is reduced.

In the present disclosure, the first protective cover plate 100 is disposed at the outermost side of the display device 000. Therefore, when the front surface of the display device 000 is subjected to the impact force, the first protective cover plate 100 in the display device 000 is the main stressed component. In this way, when the thickness of the first protective cover plate 100 is greater than the thickness of the second protective cover plate 200, the first protective cover plate 100 can withstand a larger impact force, such that the first protective cover plate 100 is not easily broken.

Exemplarily, in the display device 000, the thickness of the first protective cover plate 100 ranges from 1.5 mm to 3 mm; and the thickness of the second protective cover plate 200 ranges from 0.7 mm to 1.5 mm. The thickness of the first bonding layer 300 ranges from 0.1 mm to 0.8 mm. The material of the first bonding layer 300 may be optical glue, which has a certain elasticity after curing. Materials of the first protective cover plate 100 and the second protective cover plate 200 are both glass, with larger hardness.

The following embodiments will compare the stress in an example that the thickness of the first protective cover plate 100 is 1.8 mm, the thickness of the second protective cover plate 200 is 1.1 mm, and the thickness of the first bonding layer 300 is 0.2 mm with the stress when the protective cover plate with a single layer thickness of 2.9 mm in the related art is subjected to an impact force.

In the related art, for the solution of protecting the display panel with the protective cover plate with a single layer thickness of 2.9 mm, assuming that when a falling ball falls from a height and hits the protective cover plate, the protective cover plate needs to withstand the impact force exerted by the falling ball, and the protective cover plate will be instantaneously deformed. At this point, this deformation will be transmitted to the display panel below, causing the display panel to be deformed. Therefore, even if the protective cover plate with a thickness of 2.9 mm is adopted in the related art, there is still a risk that the display panel is broken.

In the embodiments of the present disclosure, for the solution of protecting the display panel 400 by adopting the first protective cover plate 100 with a thickness of 1.8 mm and the second protective cover plate 200 with a thickness of 1.1 mm at the same time, assuming that when the falling ball falls from a height and hits the first protective cover plate 100, both the first protective cover plate 100 and the second protective cover plate 200 will withstand the impact force exerted by the falling ball. The first protective cover plate 100 will be instantaneously deformed first, and this deformation will be transmitted to the first bonding layer 300 disposed between the first protective cover plate 100 and the second protective cover plate 200. Due to certain elasticity, the first bonding layer 300 is easier to deform than the first protective cover plate 100, such that the first bonding layer 100 can release most of the impact generated by the impact force. Then the elastic deformation generated by the first bonding layer 300 will enable the deformation generated by the second protective cover plate 200 to be smaller when transmitted to the second protective cover plate 200. When the deformation is transmitted to the display panel 400 below, the display panel 400 will not be deformed basically. Therefore, in the solution of protecting the display panel 400 by adopting the first protective cover plate 100 and the second protective cover plate 200 at the same time according to the embodiments of the present disclosure, the risk that the display panel 400 is broken is lower, such that the impact resistance of the display device 000 is better.

Exemplarily, the first bonding layer 300 may be a planar bonding layer disposed as a whole layer. In this way, the first bonding layer 300 can be bonded to the first protective cover plate 100 with the entire surface and the second protective cover plate 200 with the entire surface. It should be noted that the planar bonding layer disposed as a whole layer in the embodiments of the present disclosure means that this bonding layer is continuously distributed at least in the display region of the display device 000. In this way, after being subjected to the impact force, each position of the display region of the display device 000 can be buffered by the first bonding layer 300, thus ensuring higher overall strength of the display device 000.

In addition, in the related art, it is necessary to protect the display panel by adopting a protective cover plate with a thickness of 2.9 mm, the material of the protective cover plate is usually glass, but the glass panel with a thickness of 2.9 mm is not common on the market and needs to be customized separately. Therefore, the cost of the display device in the related art is higher.

In the embodiments of the present disclosure, the display panel 400 may be protected by adopting the first protective cover plate 100 with a thickness of 1.8 mm and the second protective cover plate 200 with a thickness of 1.1 mm at the same time, and the glass panel with a thickness of 1.8 mm and the glass panel with a thickness of 1.1 mm are both common glass panels on the market. Therefore, there is no need to customize the glass panel separately, and the manufacturing cost of the display device can be effectively reduced.

In the embodiments of the present disclosure, as shown in FIG. 3, the display device 000 may further include: a touch panel 500 disposed between the second protective cover plate 200 and the display panel 400, a second bonding layer 600 disposed between the touch panel 500 and the second protective cover plate 200, and a third bonding layer 700 disposed between the touch panel 500 and the display panel 400. The second bonding layer 600 in the display device 000 may be bonded to the touch panel 500 and the second protective cover plate 200 respectively. The third bonding layer 700 in the display device 000 may be bonded to the touch panel 500 and the display panel 400 respectively.

In the present disclosure, the second bonding layer 600 between the touch panel 500 and the second protective cover plate 200, and the third bonding layer 700 between the touch panel 500 and the display panel 400 can both buffer the impact force after the front surface of the display device 000 is subjected to the impact force. In this way, the probability of breakage of the display device 000 during use can be further reduced.

Exemplarily, the second bonding layer 600 and the third bonding layer 700 may be both planar bonding layers disposed as whole layers. In this way, the second bonding layer 600 may be bonded to the second protective cover plate 200 with the entire surface and the touch panel 500 with the entire surface. The third bonding layer 700 may also be bonded to the touch panel 500 with the entire surface and the display panel 400 with the entire surface. In this way, each position of the display region of the display device 000 can be buffered not only by the first bonding layer 300, but also by the second bonding layer 600 and the third bonding layer 700 after being subjected to the impact force, thus further improving the overall strength of the display device 000.

In the present disclosure, the thickness of the second bonding layer 600 and the thickness of the third bonding layer 700 both range from 0.1 mm to 0.3 mm. Exemplarily, the thickness of the second bonding layer 600 and the thickness of the third bonding layer 700 may be both equal to the thickness of the first bonding layer 300, for example, the thickness of the first bonding layer 300, the thickness of the second bonding layer 600, and the thickness of the third bonding layer 700 are all 0.2 mm.

Optionally, materials of the second bonding layer 600 and the third bonding layer 700 may be both optical glue. That is, the materials of the first bonding layer 300, the second bonding layer 600 and the third bonding layer 700 in the display device 000 are the same.

It should be noted that the display panel 400 in the display device 000 in the embodiments of the present disclosure can enable the display device 000 to realize a display function, and the touch panel 500 can enable the display device 000 to realize a touch function.

Exemplarily, after the display device 000 according to the embodiments of the present disclosure is placed on a gasket with a thickness of 2 mm, the experimental data of whether the display device 000 is broken or not can refer to Table 1 when the falling ball with a mass of 500 g is adopted to hit the front surface of the display device 000 from different heights.

TABLE 1

| Height/Unit: cm | Sample 1 | Sample 2 | Sample 3 |
| --- | --- | --- | --- |
| 20 | Normal | Normal | Normal |
| 30 | Normal | Normal | Normal |
| 40 | Normal | Normal | Normal |
| 50 | Normal | Normal | Normal |
| 60 | Normal | Normal | Normal |
| 70 | Normal | Normal | Normal |
| 80 | Normal | Normal | Normal |
| 90 | Normal | Normal | Normal |
| 100 | Normal | Normal | Normal |
| 110 | Normal | Normal | Normal |
| 125 | Normal | Normal | Normal |
| 130 | Abnormal | Normal | Normal |
| 135 | Abnormal | Abnormal | Abnormal |

In Table 1, sample 1, sample 2, and sample 3 are three different display devices, and structures of these three display devices are the same as that of the embodiments of the present disclosure. When the falling ball hits the three samples from a height of 125 cm respectively, sample 1, sample 2 and sample 3 are all normal, that is, the display function and the touch function of sample 1, sample 2 and sample 3 are all normal; when the falling ball hits the three samples from a height of 130 cm respectively, sample 1 is abnormal, and sample 2 and sample 3 are normal, that is, the display function or touch function of sample 1 is abnormal, and the display function and the touch function of sample 2 and sample 3 are normal. Therefore, according to the experimental data in Table 1, the display device according to the embodiments of the present disclosure can basically withstand the impact force exerted after the falling ball with a mass of 500 g falls from a height of 130 cm.

In the embodiments of the present disclosure, as shown in FIG. 3, an orthographic projection of the first protective cover plate 100 in the display device 000 on the plane where the second protective cover plate 200 is disposed may be disposed in an orthographic projection of the second protective cover plate 200 on the plane where the second protective cover plate 200 is disposed. The second protective cover plate 200 includes a protruding part G, and an orthographic projection of the protruding part G on the plane where the second protective cover plate 200 is disposed is not covered by the orthographic projection of the first protective cover plate 100 on the plane where the second protective cover plate 200 is disposed. The plane where the second protective cover plate 200 is disposed may be one surface of the second protective cover plate 200 proximal to the display panel 400 or one surface of the second protective cover plate 200 distal to the display panel 400.

In the present disclosure, the protruding part G of the second protective cover plate 200 is a stepped structure. As the display device 000 includes the first protective cover plate 100 and the second protective cover plate 200 which are stacked, by adjusting the area of the first protective cover plate 100 relative to the second protective cover plate 200, the stepped structure can be directly obtained by the first protective cover plate 100 and the second protective cover plate 200 through the first bonding layer 300.

Figure 4:
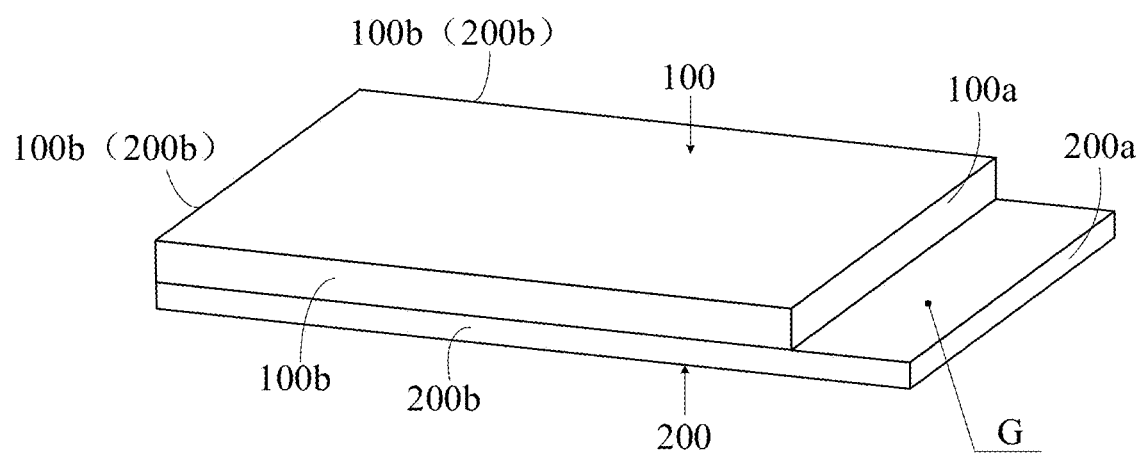
FIG. 4 is an assembling schematic diagram of a first protective cover plate and a second protective cover plate in the display device shown in FIG. 2.
Figure 5:
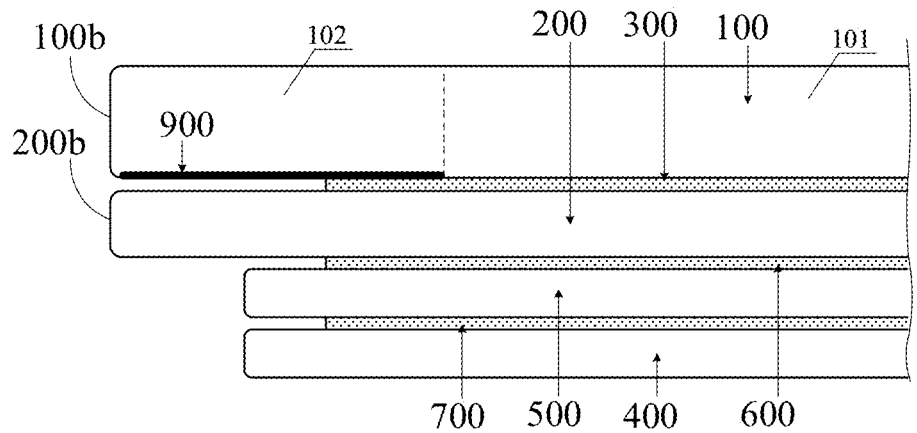
FIG. 5 is a cross-sectional view of the display device shown in FIG. 2 at B-B'.

Exemplarily, as shown in FIG. 3, FIG. 4, and FIG. 5, FIG. 4 is an assembling schematic diagram of the first protective cover plate and the second protective cover plate in the display device shown in FIG. 2, and FIG. 5 is a cross-sectional view of the display device shown in FIG. 2 at B-B'. The display device 000 is rectangular, both the first protective cover plate 100 and the second protective cover plate 200 in the display device 000 may be rectangular cover plates, and the display panel 400 and the touch panel 500 in the display device 000 are also rectangular panels. The first protective cover plate 100 has a first side surface 100a and three second side surfaces 100b, and the second protective cover plate 200 has a third side surface 200a and three fourth side surfaces 200b. The first side surface 100a of the first protective cover plate 100 is adjacent to the third side surface 200a of the second protective cover plate 200, and this first side surface 100a is staggered from the third side surface 200a, that is, the first side surface 100a and the third side surface 200a are not coplanar. The three second side surfaces 100b of the first protective cover plate 100 are in one-to-one correspondence with three fourth side surfaces 200b of the second protective cover plate 200, each second side surface 100b in the first protective cover plate 100 is adjacent to the corresponding fourth side surface 200b in the second protective cover plate 200, and each second side surface 100b and the corresponding fourth side surface 200b are coplanar.

In this case, the orthographic projection of the first protective cover plate 100 on the plane where the second protective cover plate 200 is disposed may be disposed in the orthographic projection of the second protective cover plate 200 on the plane where the second protective cover plate 200 is disposed, and the first side surface 100a of the first protective cover plate 100 is adjacent to and staggered from the third side surface 200a of the second protective cover plate 200. Therefore, the part of the second protective cover plate 200 between the first side surface 100a and the third side surface 200a is the protruding part G. In this way, in the embodiments of the present disclosure, the protruding part G can be formed by combining the first protective cover plate 100 and the second protective cover plate 200 in a staggered manner, without a need to cut the protective cover plates, thus effectively simplifying the process of forming the protruding part G in the display device 000, further improving the preparation efficiency of the display device 000 and reducing the manufacturing cost of the display device 000.

Figure 6:
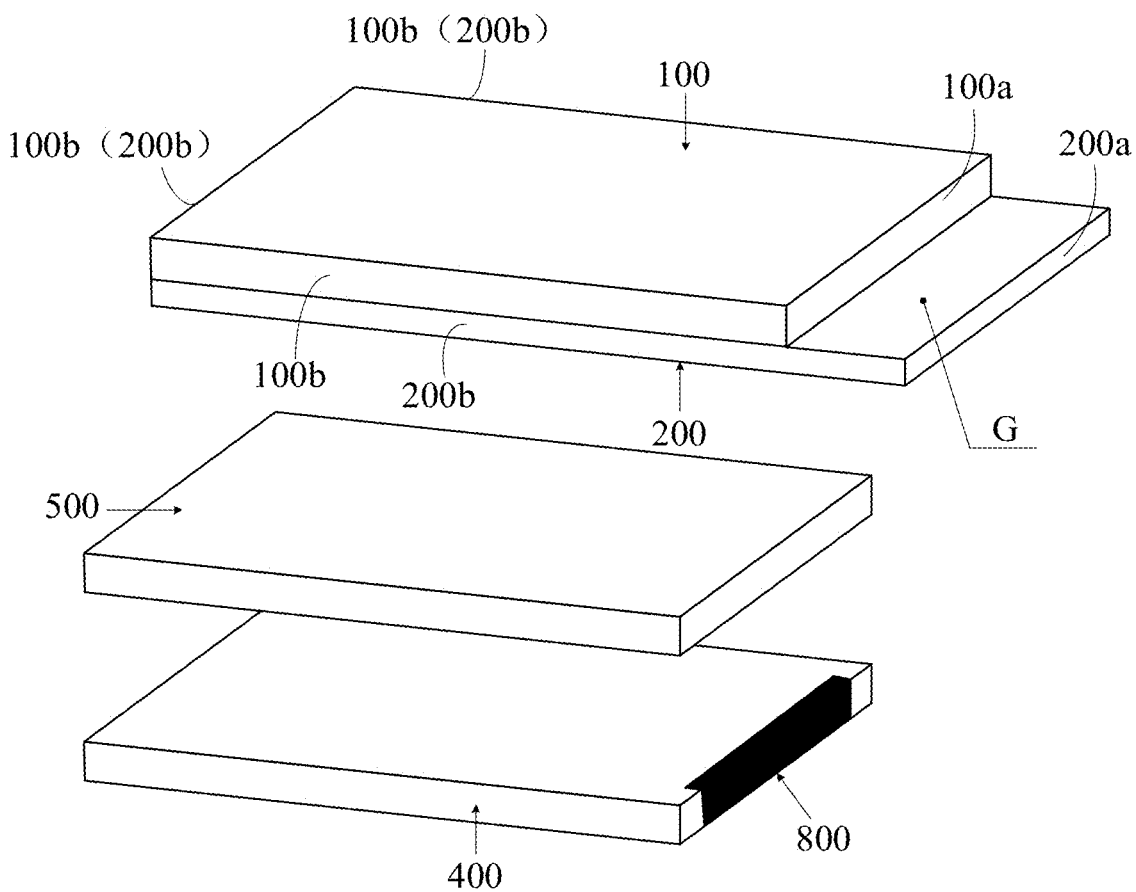
FIG. 6 is an exploded view of the display device shown in FIG. 2.

In the embodiments of the present disclosure, referring to FIG. 6, which is an exploded view of the display device shown in FIG. 2. The display panel 400 in the display device 000 has a binding region (not marked in FIG. 6), and the binding region of the display panel 400 is configured for binding with a driving component 800. The driving component 800 is configured to drive the display panel 400 to display a picture, and the driving component 800 may be a driving chip or a flexible printed circuit board with a driving chip. The binding region of the display panel 400 and the protruding part G of the second protective cover plate 200 are disposed on the same side of the display device, that is, the binding region of the display panel 400 is adjacent to the protruding part G.

In the present disclosure, as shown in FIG. 2, the first protective cover plate 100 in the display device 000 has a central light-transmitting region 101 and an edge light-shielding region 102 disposed at the periphery of the central light-transmitting region 101. The display panel 400 has a display region and a non-display region disposed at the periphery of the display region, and an orthographic projection of the display region of the display panel 400 on the first protective cover plate 100 is disposed in the central light-transmitting region. The binding region of the display panel 400 is usually disposed on one side of the non-display region. Therefore, in the non-display region of the display panel 400, the width of one side where the binding region is set is greater than those of the other three sides. In this way, the width of one side, adjacent to the binding region of the display panel 400, in the edge light-shielding region 102 of the first protective cover plate 100 can be reduced by forming the protruding part G through staggering of the first protective cover plate 100 and the second protective cover plate 200 and enabling the protruding part G to be adjacent to the binding region of the display panel 400. Further, the width at each position of the edge light-shielding region 102 of the first protective cover plate 100 can be approximately equal when viewed from the front surface of the display device 000. It should be noted that a structure (for example, a shell or silica gel, etc.) different from the material of the first protective cover plate 100 usually needs to be placed on the protruding part G. Therefore, when the display device 000 is viewed from the front surface, the width at each position of a black edge region (i.e., the edge light-shielding region 102) of the first protective cover plate 400 made of glass is approximately equal, which can ensure the aesthetics of the display device 000 when viewed from the front surface.

Exemplarily, as shown in FIG. 3 and FIG. 5, the display device 000 may further include: a light-absorbing ink layer 900 disposed on one side of the first protective cover plate 100 proximal to the second protective cover plate 200. The light-absorbing ink layer 900 may be a black ink layer, which can block light emergent from the side surface of the display panel 400, and the light-absorbing ink layer 900 may be disposed in the edge light-shielding region 102 of the first protective cover plate 100. That is, in the first protective cover plate 100, the region where the light-absorbing ink layer 900 is disposed is the edge light-shielding region 102, and the region where the light-absorbing ink layer 900 is not disposed is the central light-transmitting region 101.

In this case, the light-absorbing ink layer 900 is annular, and an inner contour line of the light-absorbing ink layer 900 coincides with an outer contour line of the central light-transmitting region 101. In this way, the width of the edge light-shielding region 102 of the first protective cover plate 100 can be changed by adjusting the width of the light-absorbing ink layer 900. In this way, when the width at each position of the light-absorbing ink layer 900 is the same, the width at each position of the edge light-shielding region 102 of the first protective cover plate 100 is also the same, thereby ensuring the aesthetics of the display device 000 when viewed from the front surface. Further, the light-absorbing ink layer 900 is disposed on one side of the first protective cover plate 100 proximal to the second protective cover plate 200, so that the light-absorbing ink layer 900 is closer to an observer and the aesthetics of the display device 000 when viewed from the front surface is further improved.

It can be understood that the equal width at each position of the light-absorbing ink layer 900 means that when the contour of the central light-transmitting region 101 is rectangular, the width of four sides of the rectangle of the light-absorbing ink layer 900 is equal.

In other possible implementations, the light-absorbing ink layer in the display device may also be disposed on the second protective cover plate 200. Exemplarily, the second protective cover plate 200 may also have a central light-transmitting region and an edge light-shielding region disposed at the periphery of the central light-transmitting region, and the light-absorbing ink layer in the display device is disposed in the edge light-shielding region. Moreover, the light-absorbing ink layer in the display device may be one side of the second protective cover plate 200 proximal to the first protective cover plate 100, or the light-absorbing ink layer in the display device may be one side of the second protective cover plate 200 proximal to the display panel 400. The embodiments of the present disclosure do not specifically limit the position of the light-absorbing ink layer.

Figure 7:
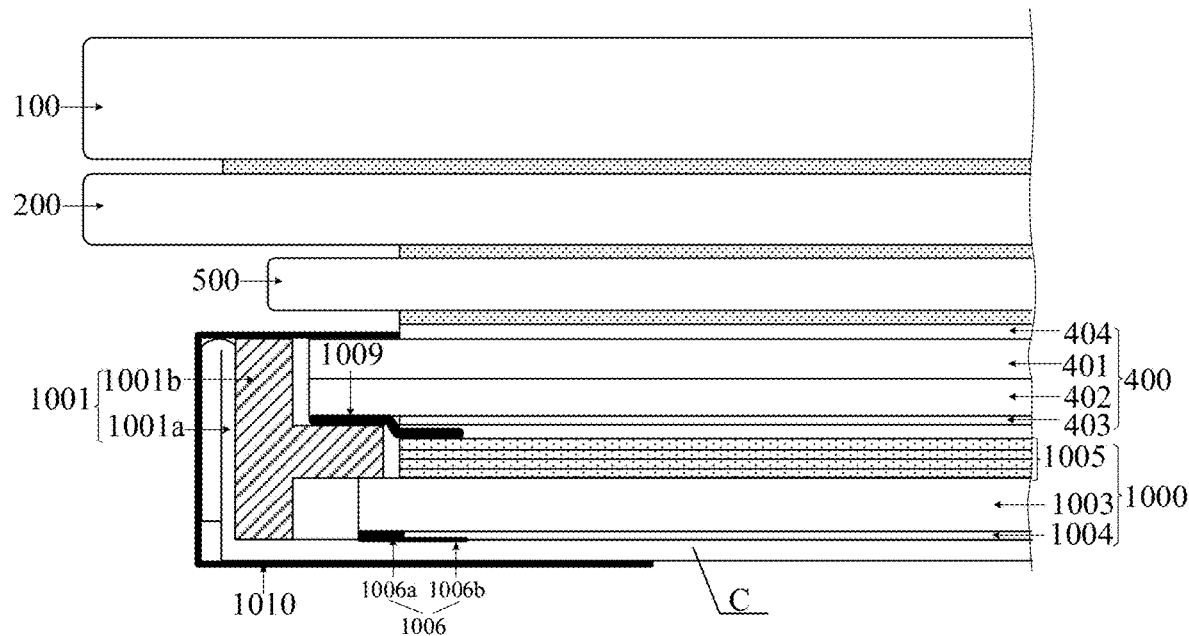
FIG. 7 is a partial cross-sectional view of another display device on one side according to some embodiments of the present disclosure.
Figure 8:
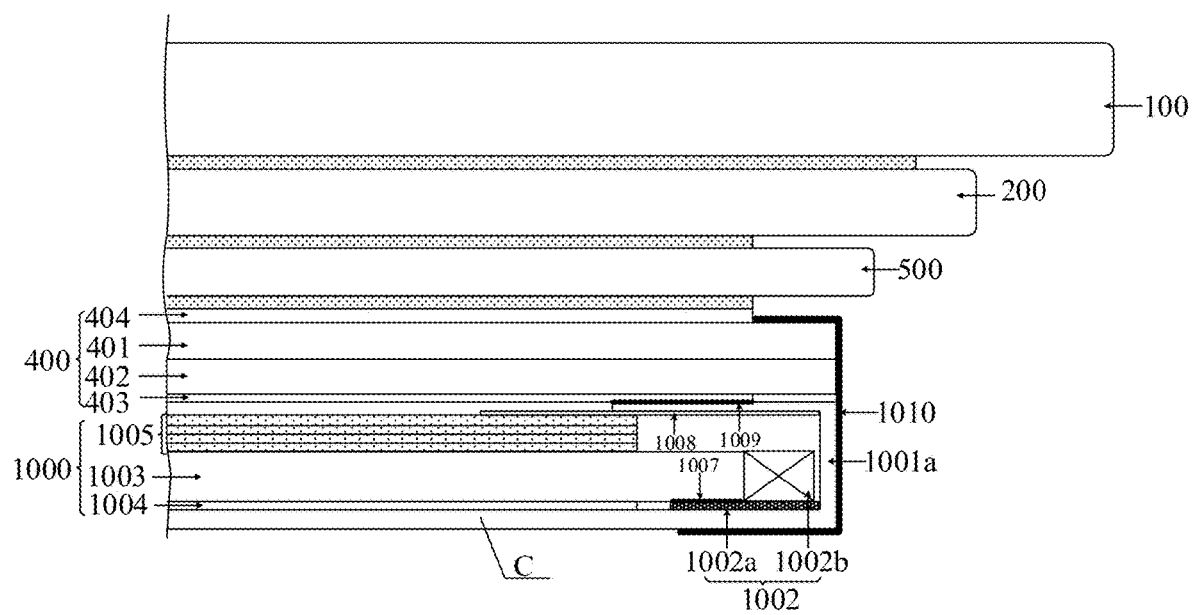
FIG. 8 is a partial cross-sectional view of another display device on another side according to some embodiments of the present disclosure.

In the embodiments of the present disclosure, the display panel 400 in the display device 000 may be an organic light-emitting diode (OLED) or liquid crystal display panel. Referring to FIG. 7 and FIG. 8. FIG. 7 is a partial cross-sectional view of another display device disposed on one side according to some embodiments of the present disclosure, and FIG. 8 is a partial cross-sectional view of another display device disposed on another side according to some embodiments of the present disclosure. When the display panel 400 in the display device 000 is a liquid crystal display panel, the display device 000 may further include: a backlight module 1000 disposed on one side of the display panel 400 distal to the second protective cover plate 200.

The display panel 400 may include: an array substrate 401 and a color film substrate 402 which are oppositely disposed, and a liquid crystal layer (not shown in FIG. 7) disposed between the array substrate 401 and the color film substrate 402. In the display panel 400, the color film substrate 402 is closer to the second protective cover plate 200 than the array substrate 401, and the array substrate 401 is closer to the backlight module 1000 than the color film substrate 402. Therefore, the color film substrate 402 can be connected with the touch panel 500, and the array substrate 401 can be connected with the backlight module 1000. It should be noted that the display panel 400 may further include a first polarizer 403 disposed on one side of the array substrate 401 distal to the color film substrate 402 and a second polarizer 404 disposed on one side of the color film substrate 402 distal to the array substrate 401. A polarization direction of the first polarizer 403 may be perpendicular to a polarization direction of the second polarizer 404.

In the embodiments of the present disclosure, the backlight module 1000 may be a side-lit backlight module or a direct-lit backlight module. Therefore, the embodiments of the present disclosure will respectively explain in the following two aspects:

In a first aspect, when the backlight module 1000 is a side-lit backlight module, as shown in FIG. 7 and FIG. 8, the backlight module 1000 may include: a frame body 1001, an optical diaphragm group 1005, a light guide plate 1003, and a reflective sheet 1004 which are disposed in the frame body 1001 and are stacked along a direction distal to the display panel 400, and a side-lit light source 1002 disposed in the frame body 1001 and disposed opposite to the light guide plate 1003. The light-emergent surface of the side-lit light source 1002 faces the side surface of the light guide plate 1003, the light guide plate 1003 is disposed between the reflective sheet 1004 and the optical diaphragm group 1005, and the optical diaphragm group 1005 is closer to the display panel 400 than the light guide plate 1003. The optical diaphragm group 1005 may include one optical diaphragm or a plurality of optical diaphragms. When the optical diaphragm group 1005 includes a plurality of optical diaphragms, these optical diaphragms may be respectively a first diffuser, a first prism, a second prism, and a second diffuser which are stacked along a direction perpendicular to and distal to the light guide plate 1003.

The frame body 1001 may include: an iron frame 1001a and an adhesive frame 1001b connected with the iron frame 1001a. The frame body 1001 is usually an adhesive-iron integrated structure, that is, after the iron frame 1001a is formed, the adhesive frame 1001b is directly formed in the iron frame 1001a by an injection molding process; and the iron frame 1001a and the adhesive frame 1001b in the frame body 1001 may also be clamped by means of buckling, which is not limited by the embodiments of the present disclosure. The iron frame 1001a may be provided with a back plate C, and the side-lit light source 1002, the light guide plate 1003, and the reflective sheet 1004 may all be disposed on the back plate C. Exemplarily, the material of the iron frame 1001a may be the metal material with better heat dissipation, for example, the iron frame 100al may be made of metal aluminum.

As for an assembling manner of the light guide plate 1003 and the reflective sheet 1004 in the frame body 1001, as shown in FIG. 7, the backlight module 1000 may further include a first bonding strip 1006. The first bonding strip 1006 is disposed in the frame body 1001 and distributed on one side distal to the side-lit light source 1002. One side of the first bonding strip 1006 may be bonded to the back plate C, and the other side may be bonded to the edge part of the reflective sheet 1004 and the edge part of the light guide plate 1003 respectively. In this way, both the light guide plate 1003 and the reflective sheet 1004 can be assembled in the frame body 1001 through the first bonding strip 1006.

Exemplarily, the first bonding strip 1006 may include a strip-shaped first bonding part 1006a and a strip-shaped second bonding part 1006b. The thickness of the first bonding part 1006a is greater than the thickness of the second bonding part 1006b, the first bonding part 1006a is bonded to the edge parts of the back plate C and the light guide plate 1003 respectively, and the second bonding part 1006b is bonded to the edge parts of the back plate C and the reflective sheet 1004 respectively. In this way, the light guide plate 1003 and the reflective sheet 1004 can be assembled in the frame body 1001 respectively through the bonding parts of different thicknesses in the first bonding strip 1006.

As for an assembling manner of the side-lit light source 1002 in the frame body 1001, as shown in FIG. 8, the side-lit light source 1002 may be a strip-shaped light source. For example, the side-lit light source 1002 may include a strip-shaped circuit board 1002a and a plurality of light-emitting diode (LED) beads 1002b on the circuit board 1002a, and the plurality of LED beads 1002b on the circuit board 1002a may be disposed in a row. That is, the side-lit light source 1002 may be a light bar. The circuit board 1002a in the side-lit light source 1002 is disposed on one side of the light guide plate 1003 distal to the optical diaphragm group 1005. The backlight module 1000 may further include a second bonding strip 1007. The circuit board 1002a in the side-lit light source 1002 and the light guide plate 1003 may be bonded by the second bonding strip 1007. A light-emergent surface of the LED beads 1002b in the side-lit light source 1002 needs to face a side surface of the light guide plate 1003, and it needs to ensure that the light-emergent surface of the LED beads 1002b is in contact with the side surface of the light guide plate 1003. Meanwhile, the circuit board 1002a in the side-lit light source 1002 may be placed on and in contact with the back plate C. In this way, the back plate C can play a better heat dissipation role for the side-lit light source 1002, such that the working temperature of the side-lit light source 1002 is lower.

Figure 9:
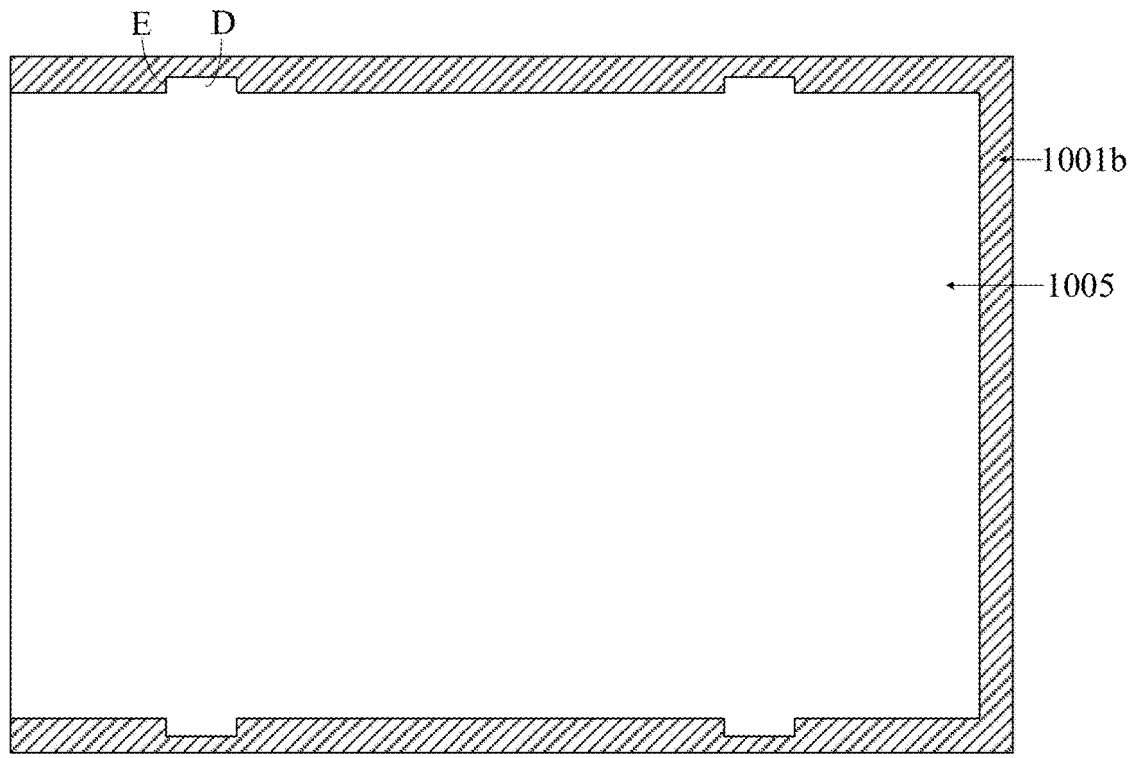
FIG. 9 is a schematic structural view of each optical diaphragm in a frame body according to some embodiments of the present disclosure.

As for an assembling manner of the optical diaphragm group 1005 in the frame body 1001, as shown in FIG. 9, FIG. 9 is a schematic structural diagram of each optical diaphragm in the frame body according to some embodiments of the present disclosure. The adhesive frame 1001b in the frame body 1001 is provided with positioning grooves E, and each optical diaphragm in the optical diaphragm group 1005 is provided with a positioning projection D. The positioning protrusion of each optical diaphragm in the optical diaphragm group 1005 may be disposed in the positioning groove E. Exemplarily, the number of the positioning grooves E in the adhesive frame 1001b is multiple, the number of the positioning protrusions D in respective optical diaphragms in the optical diaphragm group 1005 is also multiple, the plurality of positioning protrusions D in respective optical diaphragms in the optical diaphragm group 1005 are in one-to-one correspondence with the plurality of positioning grooves E in the adhesive frame 1001b, and each positioning protrusion D may be disposed in the corresponding positioning groove E. In this way, respective optical diaphragms 1005 can be assembled in the frame body 1001 through cooperation between the plurality of positioning protrusions D in the optical diaphragms and the plurality of positioning grooves E in the adhesive frame 100b.

Figure 10:
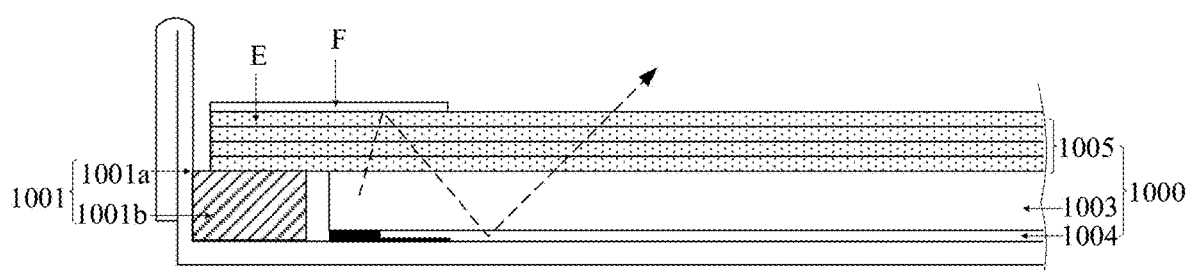
FIG. 10 is an optical path diagram of an optical diaphragm at a positioning projection according to some embodiments of the present disclosure.

In the embodiments of the present disclosure, as shown in FIG. 10, FIG. 10 is an optical path diagram of the optical diaphragm at the positioning projection according to some embodiments of the present disclosure. The positioning projection D in the optical diaphragm in the optical diaphragm group 1005 closest to the display panel 400 is provided with a reflective ink layer F. The reflective ink layer F is disposed on one side of the positioning projection D distal to the light guide plate 1003. Here, the reflective ink layer F may be a white ink layer and can reflect light. The reflective ink layer F is configured to reflect the light, incident to the positioning projection D, emergent from the light guide plate 1003 to the reflective sheet 1004.

Exemplarily, after the reflective ink layer F is disposed on the positioning projection D in the optical diaphragm in the optical diaphragm group 1005 closest to the display panel 400, the reflective ink layer F can reflect the light, incident to the positioning projection D, emergent from the light guide plate 1003 back to the light guide plate 1003, such that the reflective sheet 1004 below the light guide plate 1003 can reflect the light again, and then the reflected light can be incident to the display region of the display panel 400. In this way, by disposing the reflective ink layer F on the positioning projection D in the optical diaphragm 1005 in the optical diaphragm group 1005 closest to the display panel 400, the light-emergent efficiency of the backlight module 1000 can be effectively improved, such that the display device 000 has a higher utilization rate of light.

Optionally, as shown in FIG. 9, the backlight module 1000 may further include a reflective strip 1008. The reflective strip 1008 is disposed in the frame body 1001 and distributed on one side proximal to the side-lit light source 1002. The reflective strip 1008 may be disposed on one side of the optical diaphragm group 1005 distal to the light guide plate 1003. Here, the side of the reflective strip 1008 proximal to the optical diaphragm group 1005 may be bonded to the optical diaphragm in the optical diaphragm group 1005 closest to the display panel 400, and the side of the reflective strip 1008 distal to the optical diaphragm group 1005 may be bonded to the iron frame 100a1 in the frame body 1001.

Exemplarily, the reflective strip 1008 may be a white reflective strip. An orthogonal projection of the reflective strip 1004 on the plane where the light-emergent surface of the display panel 400 is disposed and an orthogonal projection of the side-lit light source 1002 on the plane where the light-emergent surface of the display panel 400 is disposed may exist an overlapping region. For example, an orthogonal projection of each LED bead 1002b in the side-lit light source 1002 on the plane where the light-emergent surface of the display panel 400 is disposed may be disposed in the orthogonal projection of the reflective strip 1004 on the plane where the light-emergent surface of the display panel 400 is disposed. In this way, the light, incident to the reflective strip 1008, emergent from the side-lit light source 1002 can be reflected to the light guide plate 1003 by the reflective strip 1008, and the light-emergent efficiency of the backlight module 1000 can be further improved by disposing the reflective strip 1008. It should be noted that the orthogonal projection of the reflective strip 1004 on the plane where the light-emergent surface of the display panel 400 is disposed can be disposed in the non-display region of the display panel 400.

In the embodiments of the present disclosure, as shown in FIG. 7 and FIG. 8, at least part of the display panel 400 is disposed in the frame body 1001, and the backlight module 1000 further includes: an annular adhesive layer 1009 disposed between the frame body 1001 and the display panel 400, and the annular adhesive layer 1009 is bonded to the frame body 1001 and the display panel 400 respectively. The backlight module 1000 and the display panel 400 can be assembled by the annular adhesive layer 1009.

Optionally, the display device 000 may further include: an auxiliary adhesive glue layer 1100 bonded to the edge part of the display panel 400 and the edge part of the backlight module 400 respectively. Through the auxiliary adhesive glue layer 1100, the firmness during assembling of the display panel 400 and the backlight module 1000 can be improved.

In a second aspect, when the backlight module 1000 is a direct-lit backlight module, the backlight module 1000 may include: a frame body, and an optical diaphragm group and a direct-lit light source which are disposed in the frame body and are sequentially stacked along the direction distal to the display panel. The frame body has positioning grooves, each optical diaphragm in the optical diaphragm group has a positioning protrusion, the positioning protrusion is disposed in the positioning groove, the positioning protrusion in the optical diaphragm in the optical diaphragm group closest to the display panel has a reflective ink layer, and the reflective ink layer is disposed on one side of the positioning protrusion distal to the direct-lit light source. The reflective ink layer is configured to reflect the light, incident to the positioning protrusion, emergent from the direct-lit light source to the direct-lit light source.

It should be noted that when the backlight module 1000 is a direct-lit backlight module, the structure thereof is basically similar to the structure of the side-lit backlight module, and the difference is only the light source. The direct-lit light source in the direct-lit backlight module may be a lamp panel, and this lamp panel may include: a circuit board, a reflective layer disposed on one side of the circuit board proximal to the display panel 400, and a plurality of LED beads disposed in an array. Therefore, the light reflected by the reflective ink layer can be reflected again by the reflective layer in the direct-lit light source, and the reflected light can be incident to the display region of the display panel 400. Other structures in the direct-lit backlight module may refer to the corresponding contents in the above side-lit backlight module, which will not be described in detail in the embodiments of the present disclosure.

In the present disclosure, the display device 000 may be any product or device with a display function, such as a mobile phone, a tablet computer, a television, or a medical display device. Exemplarily, the display device 000 in the embodiments of the present disclosure has better impact resistance, and thus is particularly suitable for medical devices used outdoors.

In summary, the display device according to the embodiments of the present disclosure includes the first protective cover plate, the second protective cover plate, the first bonding layer, and the display panel. After the front surface of the display device is subjected to an impact force, both the first protective cover plate and the second protective cover plate can withstand the impact force, and the first bonding layer disposed between the first protective cover plate and the second protective cover plate can buffer the impact force. In this way, by the first protective cover plate and the second protective cover plate which are stacked and the first bonding layer disposed therebetween, the display panel can be effectively protected, and the probability of breakage of the display device during use is reduced. In addition, a step structure can be directly formed by combining the first protective cover plate and the second protective cover plate in a staggered manner, and there is no need to cut the protective cover plates, thus effectively simplifying the process of forming a platform structure in the display device, further improving a preparation efficiency of the display device and reducing a manufacturing cost of the display device.

It should be noted that in the accompanying drawings, for clarity of the illustration, the dimensions of the layers and regions may be scaled up. It may be understood that when an element or layer is described as being "above" another element or layer, the described element or layer may be directly on the other element or layer, or at least one intermediate layer may be disposed between the described element or layer and the other element or layer. In addition, it may be understood that when an element or layer is described as being "below" another element or layer, the described element or layer may be directly below the other element or layer, or at least one intermediate layer may be disposed between the described element or layer and the other element or layer. In addition, it may be further understood that when a layer or element is described as being arranged "between" two layers or elements, the described layer or element may be the only layer between the two layers or elements, or at least one intermediate layer or element may be disposed between the described element or layer and the two layers or elements. In the whole specification described above, like reference numerals denote like elements.

In the present disclosure, the terms "first" and "second" are configured for descriptive purposes only and are not to be construed as indicating or implying relative importance. The term "plurality" refers to two or more, unless specifically defined otherwise.

Described above are merely exemplary embodiments of the present disclosure, but are not intended to limit the present disclosure. Any modifications, equivalent replacements, improvements, and the like made within the spirit and principles of the present disclosure should be included within the scope of protection of the present disclosure.

The invention claimed is:

1. A display device, comprising: a first protective cover plate, a second protective cover plate, a first bonding layer, and a display panel; wherein
   the first bonding layer is disposed between the first protective cover plate and the second protective cover plate and is bonded to the first protective cover plate and the second protective cover plate; and
   the display panel is disposed on one side of the second protective cover plate distal to the first protective cover plate, and a light-emergent side of the display panel faces the second protective cover plate;
   wherein a thickness of the first protective cover plate is greater than a thickness of the second protective cover plate, and the second protective cover plate comprises a protruding part;
   wherein the first protective cover plate has a first side surface and three second side surfaces; and the second protective cover plate has a third side surface and three fourth side surfaces; wherein the first side surface is adjacent to the third side surface and staggered from the third side surface; and the three second side surfaces are in one-to-one correspondence with the three fourth side surfaces, and each second side surface is adjacent to and coplanar with a corresponding fourth side surface; wherein part of the second protective cover plate disposed between the third side surface and the first side surface is the protruding part.

2. The display device according to claim 1, wherein an orthographic projection of the first protective cover plate on a plane where the second protective cover plate is disposed falls within an orthographic projection of the second protective cover plate on the plane where the second protective cover plate is disposed;
   and an orthographic projection of the protruding part on the plane where the second protective cover plate is disposed is not covered by the orthographic projection of the first protective cover plate on the plane where the second protective cover plate is disposed.

3. The display device according to claim 2, wherein the display panel has a binding region for binding with a driving component, wherein the binding region and the protruding part are disposed on a same side of the display device.

4. The display device according to claim 1, wherein the first protective cover plate has a central light-transmitting region and an edge light-shielding region disposed at a periphery of the central light-transmitting region, and the display device further comprises: a light-absorbing ink layer disposed on one side of the first protective cover plate proximal to the second protective cover plate, wherein the light-absorbing ink layer is disposed in the edge light-shielding region;
or, the second protective cover plate has a central light-transmitting region and an edge light-shielding region disposed at a periphery of the central light-transmitting region, and the display device further comprises: a light-absorbing ink layer disposed on one side of the second protective cover plate proximal to the first protective cover plate, wherein the light-absorbing ink layer is disposed in the edge light-shielding region;
or, the second protective cover plate has a central light-transmitting region and an edge light-shielding region disposed at a periphery of the central light-transmitting region, and the display device further comprises: a light-absorbing ink layer disposed on one side of the second protective cover plate proximal to the display panel, wherein the light-absorbing ink layer is disposed in the edge light-shielding region.

5. The display device according to claim 4, wherein the light-absorbing ink layer is annular, an inner contour line of the light-absorbing ink layer coincides with an outer contour line of the central light-transmitting region, and a width at each position of the light-absorbing ink layer is a same.

6. The display device according to claim 1, wherein the thickness of the first protective cover plate ranges from 1.5 mm to 2 mm; the thickness of the second protective cover plate ranges from 0.7 mm to 1.5 mm; and a thickness of the first bonding layer ranges from 0.1 mm to 0.3 mm.

7. The display device according to claim 1, wherein the first bonding layer is a planar bonding layer disposed as a whole layer.

8. The display device according to claim 1, further comprising: a touch panel disposed between the second protective cover plate and the display panel, a second bonding layer disposed between the touch panel and the second protective cover plate, and a third bonding layer disposed between the touch panel and the display panel;
wherein the second bonding layer is bonded to the touch panel and the second protective cover plate, and the third bonding layer is bonded to the touch panel and the display panel.

9. The display device according to claim 8, wherein the second bonding layer and the third bonding layer are both planar bonding layers disposed as whole layers.

10. The display device according to claim 8, wherein a thickness of the first bonding layer, a thickness of the second bonding layer, and a thickness of the third bonding layer are equal.

11. The display device according to claim 1, wherein the display panel comprises: a color film substrate and an array substrate which are disposed oppositely, and a liquid crystal layer disposed between the color film substrate and the array substrate, wherein the color film substrate is closer to the second protective cover plate than the array substrate; and the display device further comprises: a backlight module disposed on one side of the display panel distal to the second protective cover plate.

12. The display device according to claim 11, wherein the backlight module comprises: a frame body, an optical diaphragm group, a light guide plate, and a reflective sheet which are disposed in the frame body and are sequentially stacked along a direction distal to the display panel, and a side-lit light source disposed in the frame body and disposed opposite to the light guide plate;
the frame body comprises: an iron frame and an adhesive frame connected with the iron frame, wherein the adhesive frame is provided with positioning grooves, and each optical diaphragm in the optical diaphragm group is provided with a positioning protrusion, wherein the positioning protrusion is disposed in the positioning groove, a positioning protrusion in an optical diaphragm in the optical diaphragm group closest to the display panel is provided with a reflective ink layer, the reflective ink layer being disposed on one side of the positioning protrusion distal to the light guide plate;
wherein the reflective ink layer is configured to reflect light, incident to the positioning protrusion, emergent from the light guide plate to the reflective sheet.

13. The display device according to claim 12, wherein the iron frame is provided with a back plate, both the reflective sheet and the light guide plate are disposed on the back plate, and the backlight module further comprises: a first bonding strip, wherein the first bonding strip is disposed in the frame body and distributed on one side distal to the side-lit light source;
wherein the first bonding strip comprises: a strip-shaped first bonding part and a strip-shaped second bonding part, a thickness of the first bonding part is greater than a thickness of the second bonding part, the first bonding part is bonded to edge parts of the back plate and the light guide plate, and the second bonding part is bonded to edge parts of the back plate and the reflective sheet.

14. The display device according to claim 12, wherein the backlight module further comprises: a reflective strip, wherein the reflective strip is disposed on the frame body and distributed on one side proximal to the side-lit light source, and the reflective strip is disposed on one side of the optical diaphragm group distal to the light guide plate;
wherein an orthogonal projection of the reflective strip on a plane where a light-emergent surface of the display panel is disposed and an orthogonal projection of the side-lit light source on the plane where the light-emergent surface of the display panel is disposed exist an overlapping region; and the orthogonal projection of the reflective strip on the plane where the light-emergent surface of the display panel is disposed is disposed in a non-display region of the display panel.

15. The display device according to claim 14, wherein one side of the reflective strip proximal to the optical diaphragm group is bonded to an optical diaphragm in the optical diaphragm group closest to the display panel, and one side of the reflective strip distal to the optical diaphragm group is bonded to the iron frame.

16. The display device according to claim 12, wherein the side-lit light source comprises: a strip-shaped circuit board and a plurality of light-emitting diode (LED) beads on the circuit board, wherein the circuit board is disposed on one side of the optical diaphragm group, a light-emergent surface of the LED beads faces a side surface of the light guide plate, and the light-emergent surface of the LED beads is in contact with the side surface of the light guide plate; and the backlight module further comprises: a second bonding strip, wherein the second bonding strip is bonded to the circuit board and the light guide plate.

17. The display device according to claim 12, wherein at least part of the display panel is disposed in the frame body, and the backlight module further comprises: an annular adhesive layer disposed between the frame body and the display panel, and the annular adhesive layer is bonded to the frame body and the display panel.

18. The display device according to claim 12, wherein the backlight module further comprises: an auxiliary adhesive glue layer bonded to an edge part of the display panel and an edge part of the backlight module.

19. The display device according to claim 11, wherein the backlight module comprises: a frame body, and an optical diaphragm group and a direct-lit light source which are disposed in the frame body and are sequentially stacked along the direction distal to the display panel;

the frame body is provided with positioning grooves, and each optical diaphragm in the optical diaphragm group is provided with a positioning protrusion, wherein the positioning protrusion is disposed in the positioning groove, a positioning protrusion in an optical diaphragm in the optical diaphragm group closest to the display panel is provided with a reflective ink layer, and the reflective ink layer is disposed on one side of the positioning protrusion distal to the direct-lit light source;

wherein the reflective ink layer is configured to reflect light, incident to the positioning protrusion, emergent from the direct-lit light source to the direct-lit light source.

* * * * *